US00RE45707E

(19) United States
(12) Reissued Patent
Chang et al.

(10) Patent Number: US RE45,707 E
(45) Date of Reissued Patent: Sep. 29, 2015

(54) DISPLAY DRIVING CIRCUIT

(71) Applicant: NOVATEK MICROELECTRONICS CORP., Hsinchu (TW)

(72) Inventors: Yu-Kuang Chang, Nantou County (TW); Kuei-Chung Chang, Hsinchu County (TW); Ming-Da Chiang, Hsinchu (TW)

(73) Assignee: NOVATEK MICROELECTRONICS CORP., Hsinchu (TW)

(21) Appl. No.: 14/253,900

(22) Filed: Apr. 16, 2014

Related U.S. Patent Documents

Reissue of:

(64) Patent No.: 8,497,943
Issued: Jul. 30, 2013
Appl. No.: 13/357,197
Filed: Jan. 24, 2012

(30) Foreign Application Priority Data

Jan. 27, 2011 (TW) ..... 100103133

(51) Int. Cl.
*H04N 5/202* (2006.01)
*H04N 9/69* (2006.01)
*G09G 5/06* (2006.01)

(52) U.S. Cl.
CPC .. *H04N 9/69* (2013.01); *G09G 5/06* (2013.01); *G09G 2310/0289* (2013.01); *G09G 2320/0673* (2013.01); *G09G 2330/021* (2013.01); *G09G 2330/028* (2013.01); *G09G 2340/10* (2013.01)

(58) Field of Classification Search
CPC ..... G09G 5/06; G09G 2310/0289; G09G 2340/10; G09G 2330/027; G09G 2330/028; G09G 2320/0673; H04N 9/69
USPC ..... 348/674, 671, 739
See application file for complete search history.

(56) References Cited

U.S. PATENT DOCUMENTS

| | | | | |
|---|---|---|---|---|
| 6,806,744 | B1 * | 10/2004 | Bell et al. | 327/70 |
| 7,541,844 | B2 | 6/2009 | Chiu et al. | |
| 8,026,873 | B2 * | 9/2011 | Leon et al. | 345/76 |
| 8,125,501 | B2 * | 2/2012 | Amundson et al. | 345/690 |
| 8,183,903 | B2 * | 5/2012 | Glass et al. | 327/231 |
| 8,217,928 | B2 * | 7/2012 | Levey et al. | 345/211 |
| 2005/0195136 | A1 * | 9/2005 | Liang | 345/72 |
| 2007/0200874 | A1 * | 8/2007 | Amundson et al. | 345/690 |
| 2009/0051575 | A1 * | 2/2009 | Lee et al. | 341/136 |
| 2009/0109077 | A1 * | 4/2009 | Tsuchi et al. | 341/144 |
| 2010/0141493 | A1 * | 6/2010 | Cho et al. | 341/122 |
| 2012/0014455 | A1 * | 1/2012 | Joshi et al. | 375/240.18 |

* cited by examiner

*Primary Examiner* — Ovidio Escalante
(74) *Attorney, Agent, or Firm* — Rabin & Berdo, P.C.

(57) ABSTRACT

A display driving circuit comprising a video signal transformation circuit, a reference voltage generating circuit, a DAC and an interpolation operational amplifier is provided. The video signal transformation circuit transforms an input video signal into a transformed video signal with a higher bit depth. The transformed video signal comprises an upper n bits data and a lower m bits data, wherein n+m equals a bit depth of the transformed video signal. The reference voltage generating circuit generates reference voltages. The DAC selects a first reference voltage and a second reference voltage to interpolation operational amplifier from the reference voltages according to an upper n bits data of the transformed video signal. The interpolation operational amplifier outputs a driving voltage to display device according to the first reference voltage, the second reference voltage and the lower m bits data of the transformed video signal.

20 Claims, 6 Drawing Sheets

10

20

| P2 | $V_O$ |
|---|---|
| 0000 | $V_H$ |
| 0001 | $15/16*V_H+1/16*V_L$ |
| 0010 | $14/16*V_H+2/16*V_L$ |
| 0011 | $13/16*V_H+3/16*V_L$ |
| 0100 | $12/16*V_H+4/16*V_L$ |
| 0101 | $11/16*V_H+5/16*V_L$ |
| 0110 | $10/16*V_H+6/16*V_L$ |
| 0111 | $9/16*V_H+7/16*V_L$ |
| 1000 | $8/16*V_H+8/16*V_L$ |
| 1001 | $7/16*V_H+9/16*V_L$ |
| 1010 | $6/16*V_H+10/16*V_L$ |
| 1011 | $5/16*V_H+11/16*V_L$ |
| 1100 | $4/16*V_H+12/16*V_L$ |
| 1101 | $3/16*V_H+13/16*V_L$ |
| 1110 | $2/16*V_H+14/16*V_L$ |
| 1111 | $1/16*V_H+15/16*V_L$ |

DISPLAY DRIVING CIRCUIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of Taiwan application Serial No. 100103133, filed Jan. 27, 2011, the subject matter of which is incorporated herein by reference.

BACKGROUND OF THE INVENTION

1. Field of the Invention

The invention relates in general to a driving circuit, and more particularly to a display driving circuit.

2. Description of the Related Art

Referring to FIG. 1, a partial diagram of a conventional display driving circuit is shown. The conventional display driving circuit 10 comprises a positive gray scale display reference voltage generating circuit for gamma correction of red color channels 12a, a positive gray scale display reference voltage generating circuit for gamma correction of green color channels 12b, a positive gray scale display reference voltage generating circuit for gamma correction of blue color channels 12c, a negative gray scale display reference voltage generating circuit for gamma correction of red color channels 12d, a negative gray scale display reference voltage generating circuit for gamma correction of green color channels 12e, a negative gray scale display reference voltage generating circuit for gamma correction of blue color channels 12f, a digital to analog converter (DAC) 13, a register for storing the information of gamma corrections 15, a data latch 16, a level shifter 17 and a buffer operational amplifier 18.

The positive gray scale display reference voltage generating circuits 12a, 12b and 12c respectively generate 256 positive gray scale display reference voltages for gamma correction of red color channels, 256 positive gray scale display reference voltages for gamma correction of green color channels and 256 positive gray scale display reference voltages for gamma correction of blue color channels according to the settings for the positive display reference voltages stored in the register 15. The negative gray scale display reference voltage generating circuits 12d, 12e and 12f respectively generate 256 negative gray scale display reference voltages for gamma correction of red color channels, 256 negative gray scale display reference voltages for gamma correction of green color channels and 256 negative gray scale display reference voltages for gamma correction of blue color channels according to the settings for the negative display reference voltages stored in the register 15.

The video signals of pixel data, R[7:0]/G[7:0]/B[7:0], are serially sent into the data latch. The data latch temporarily stores the pixel data of display line for each display channel. The outputs of the data latch are connected to the level shifter. The level shifter translates the power domain for the video signal. The DAC 13 outputs one of the display reference voltages to the buffer operational amplifier from the 256 display reference voltages generated by the gray scale reference voltage generating circuit according to it's input video signal. Finally, the multiplexer mux controlled by a polarity outputs a driving voltage $V_O$ outputted from the buffer operational amplifier 18 to provide large driving ability to drive display device.

In order to independently adjust the gamma correction for each of the color channels (red, green, blue), the conventional display driving circuit 10 needs at least 3 sets of gray scale display reference voltage generating circuits, wherein each set of gray scale display reference voltage generating circuit comprises a positive gray scale display reference voltage generating circuit and a negative gray scale display reference voltage generating circuit. However, such design occupies large chip area and consumes a lot of power consumption. Furthermore, the conventional display driving circuit 10 needs considerable metal routing traces for the gray scale display reference voltages in the layout of the circuit.

SUMMARY OF THE INVENTION

The invention is related to a display driving circuit. The sets of display reference voltage generating circuits can be reduced while keeping the function of independently adjusting the gamma correction for each of the color channels. Therefore, the chip area and power consumption can be reduced. Furthermore, the number of metal routing traces in the layout can also be reduced to a great extent.

According to the present invention, a display driving circuit is provided. The display driving circuit comprises a video signal transformation circuit, a display reference voltage generating circuit, a digital to analog converter (DAC) and an interpolation operational amplifier. The video signal transformation circuit transforms an input video signal into a transformed video signal with a higher bit depth which already contains the information of gamma correction according to a lookup table (LUT). Then, the transformed video signals are serially sent into the data latch. The data latch temporarily stores the pixel data of display line for each display channel. The outputs of the data latch are connected to the level shifter. The level shifter translates the power domain for the transformed video signal. The transformed video signal from level shifter's output node is divided into upper n bits and lower m bits, wherein n+m is the bit depth of the transformed video signal. The upper n bits are connected to the input of the DAC and the lower m bits are connected to the input of the interpolation operational amplifier. The display reference voltage generating circuit generates a plurality of display reference voltages. The DAC outputs a first display reference voltage and a second display reference voltage to the interpolation operational amplifier from the display reference voltages generated by the display reference voltage generating circuits according to the upper n bits of the transformed video signal. Finally, the interpolation operational amplifier outputs a driving voltage to display device according to the first display reference voltage, the second display reference voltage and the lower m bits of the transformed video signal.

The above and other aspects of the invention will become better understood with regard to the following detailed description of the preferred but non-limiting embodiment(s). The following description is made with reference to the accompanying drawings.

DETAILED DESCRIPTION OF THE INVENTION

A display driving circuit is disclosed in a number of embodiments below. The display driving circuit comprises a video signal transformation circuit, a display reference voltage generating circuit, a digital to analog converter (DAC) and an interpolation operational amplifier. The video signal transformation circuit transforms an input video signal into a transformed video signal higher bit depth which already contains the information of gamma correction according to a lookup table (LUT). Then, the transformed video signals are serially sent into the data latch. The data latch temporarily stores the pixel data of display line for each display channel. The outputs of the data latch are connected to the level shifter. The level shifter translates the power domain for the transformed video signal. The transformed video signal from level shifter's output node is divided into upper n bits and lower m bits, wherein n+m is the bit depth of the transformed video signal. The upper n bits are connected to the input of the DAC and the lower m bits are connected to the input of the interpolation operational amplifier. The display reference voltage generating circuit generates a plurality of display reference voltages. The DAC outputs a first display reference voltage and a second display reference voltage from the display reference voltages generated by the display reference voltage generating circuits according to the upper n bits of the transformed video signal. Finally, the interpolation operational amplifier outputs a driving voltage to display device according to the first display reference voltage, the second display reference voltage and the lower m bits of the transformed video signal.

Figure 1:
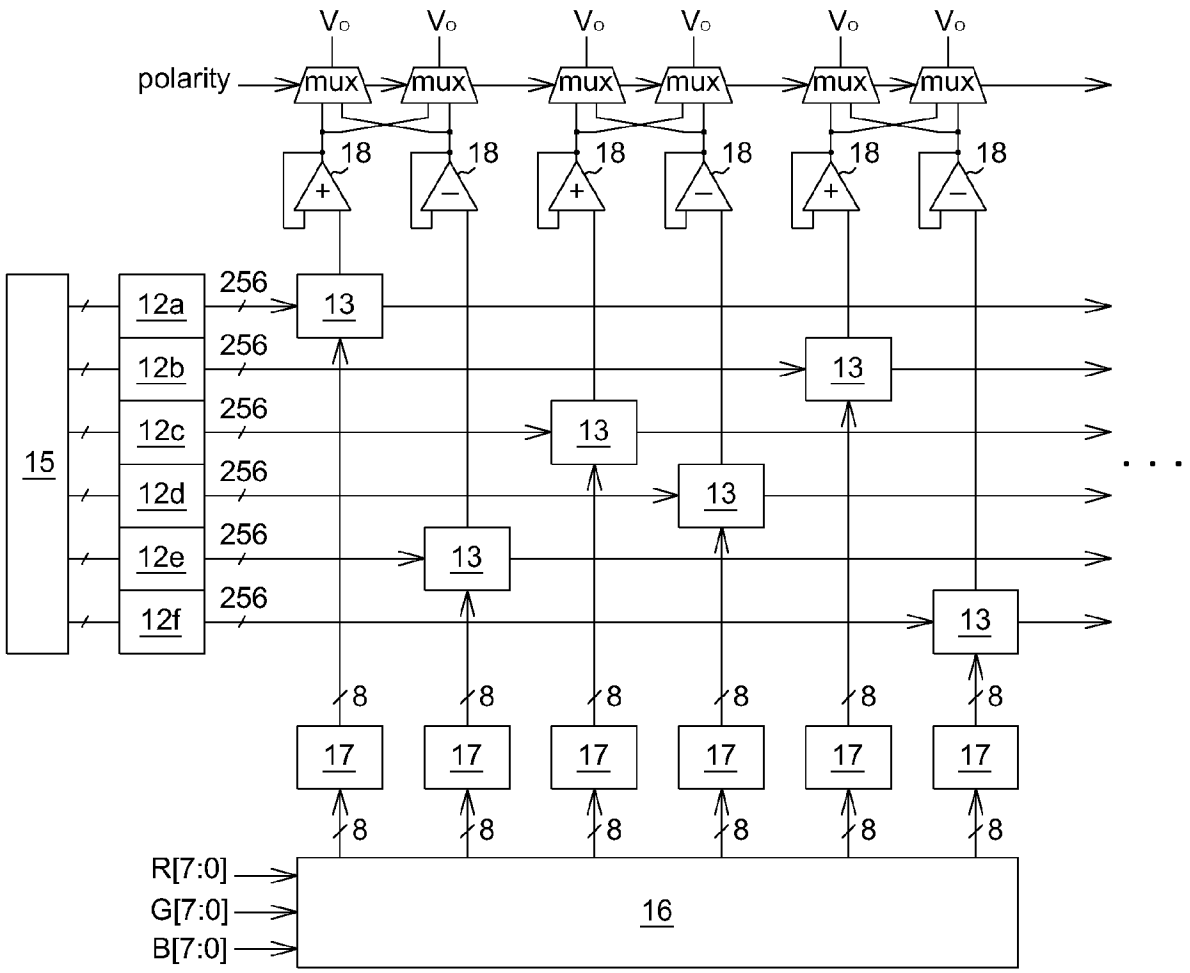
FIG. 1 (Prior Art)
FIG. 1 shows a partial diagram of a conventional display driving circuit.
Figure 2:
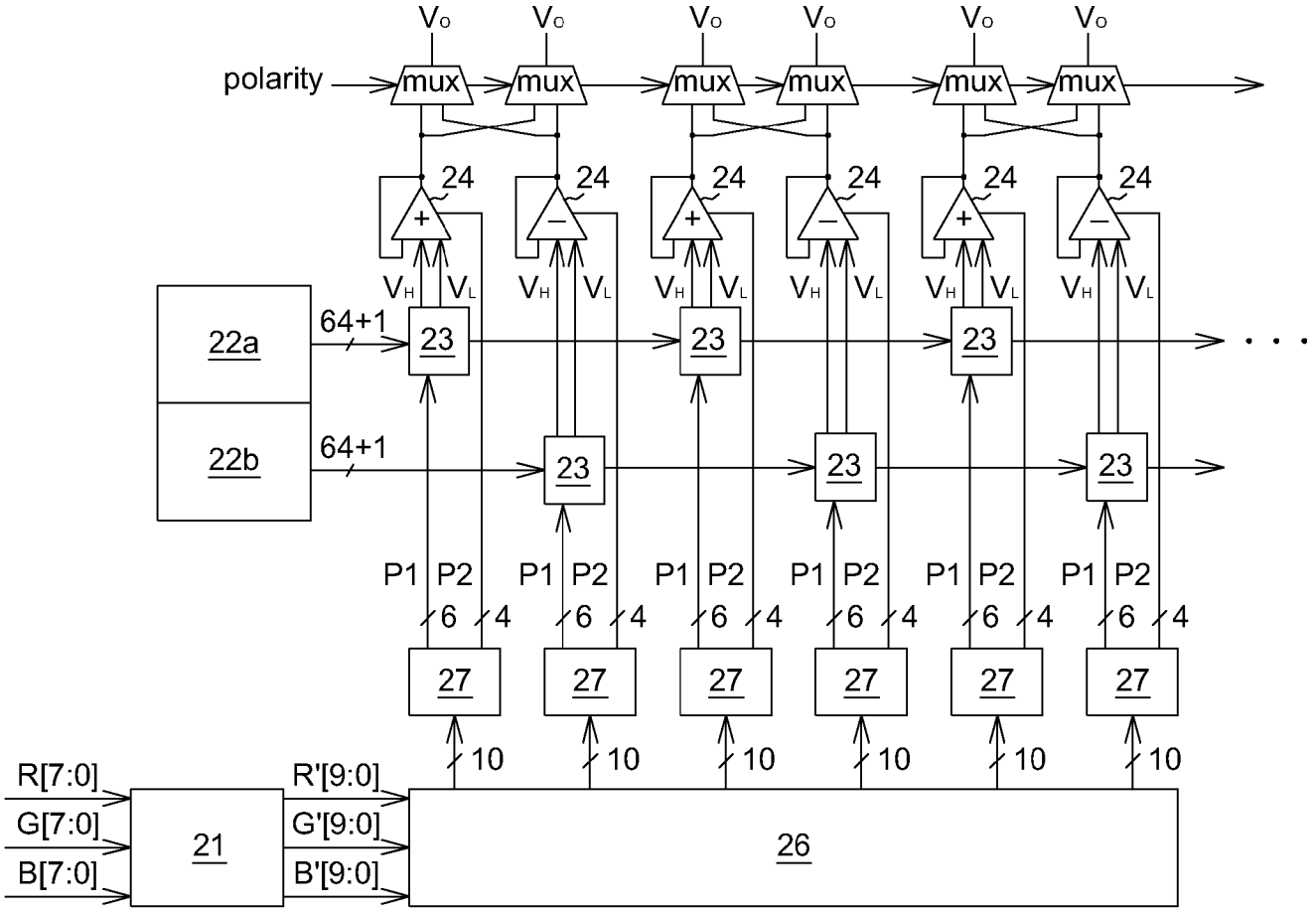
FIG. 2 shows a partial diagram of a display driving circuit according to an embodiment of the invention.

Referring to FIG. 2, a partial diagram of a display driving circuit according to an embodiment of the invention is shown. The display driving circuit 20 comprises a video signal transformation circuit 21, a display reference voltage generating circuit, a DAC 23, an interpolation operational amplifier 24, a data latch 26 and a level shifter 27. The display reference voltage generating circuit is realized by such as the positive display reference voltage generating circuit 22a or the negative display reference voltage generating circuit 22b illustrated in FIG. 2. The multiplexer mux controlled by a polarity outputs a driving voltage $V_O$ outputted from the interpolation operational amplifier 24.

The lookup table records the one-to-one mapping relationships between the input video signals and the output transformed higher bit depth video signals. In the present embodiment of the invention, the bit depth of the input video signal is 8, and the bit depth of the output transformed video signal is 10. The mapping relationships recorded in the lookup table are the information for gamma correction of red/green/blue color channels.

The video signal transformation circuit 21 transforms an input video signal into a transformed video signal with a higher bit depth which already contains the information of gamma correction according to a lookup table (LUT) and a digital interpolation technique, wherein the bit depth of the transformed video signal is higher than that of input video signal. The transformed higher bit depth video signal is divided into upper n bits and lower m bits, wherein n+m is the bit depth of the transformed video signal. The upper n bits P1 comprise upper n bits from MSB direction of the transformed video signal, and the lower m bits P2 comprise the rest m bits of the transformed video signal, wherein n+m is the bit depth of the transformed video signal. The upper n bits P1 are sent to the DAC 23 as input signal through the data latch 26 and the level shifter 27, and the lower m bits P2 are sent to the interpolation operational amplifier 24 as input signal through the data latch 26 and the level shifter 27.

In the present embodiment of the invention, n and m are respectively exemplified by 6 and 4, and bit depth of the input video signal and that of the transformed video signal are respectively exemplified by 8 and 10. The input video signal is such as the video signal R[7:0] for red color channel, the video signal G[7:0] for green color channel or the video signal B[7:0] for blue color channel illustrated in FIG. 2, and the transformed video signal is such as the video signal R'[9:0] for red color channel, the video signal G'[9:0] for green color channel or the video signal B'[9:0] for blue color channel.

The positive display reference voltage generating circuit 22a generates a plurality of positive display reference voltages, and the negative display reference voltage generating circuit 22b generates a plurality of negative display reference voltages. For example, when the bit depth of the input video signal equals 8, the number of display reference voltages generated by the display reference voltage generating circuit for each color channel can be reduced to less than $2^8$. In the present embodiment of the invention, the number of positive display reference voltages and that of negative display reference voltages respectively are exemplified by $2^6+1$. The one extra reference voltage is used as one of the reference point for interpolation.

In comparison to the conventional display driving circuit 10, the display driving circuit 20 uses only one set of positive display reference voltage generating circuit and one set of negative display reference voltage generating circuit instead of three sets of positive display reference voltage generating circuits and three sets of negative display reference voltage generating circuits. In addition to reducing several sets of display reference voltage generating circuits, the display driving circuit 20 further reduces the chip area and power consumption. Furthermore, the number of metal routing traces in the layout of the circuit can also be reduced.

In the present embodiment of the invention, the number of bits of the DAC 23 is exemplified by 6. The upper 6 bits of the transformed video signal P1 from the level shifter are sent to the DAC 23 as input signal. Then, the DAC 23 outputs two adjacent display reference voltages, $V_H$ and $V_L$, from $2^6+1$ display reference voltages to the interpolation amplifier. The interpolation operational amplifier 24 outputs a driving voltage to display device according to the first display reference voltage $V_H$, the second display reference voltage $V_L$ and the lower 4 bits of the transformed video signal P2.

Figure 3:
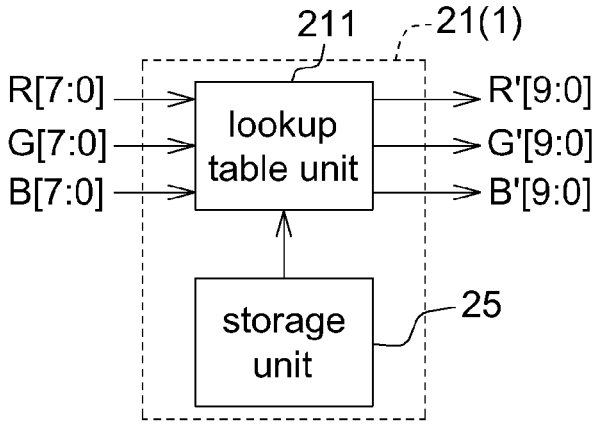
FIG. 3 shows a first type of video signal transformation circuit.

Referring to FIG. 3, a first type of video signal transformation circuit is shown. The video signal transformation circuit 21 illustrated in the FIG. 2 is implemented by such as the video signal transformation circuit 21(1) illustrated in FIG. 3.

The video signal transformation circuit 21(1) comprises a storage unit 25 and a lookup table unit 211, wherein the storage unit 25, realized by such as registers, stores the lookup values of the lookup table. The lookup values stored in the storage unit are the settings of display reference voltage for gamma corrections of red/green/blue color channels. The lookup table therefore records the information of the gamma correction curves. The lookup table records one-to-one mapping relationships between all input video signal values and the corresponding output values. The input signal of the video signal transformation circuit can be directly transformed to the corresponding output signal by the lookup table. The bit depth of the output signal of the video signal transformation circuit is greater than that of the input signal. For example, the input and output signals of the video signal transformation circuit are respectively 8-bit and 10-bit, and the lookup table records one-to-one mapping relationships between all the data values of 8-bit input signals and the corresponding 10-bit output values. That is, 256 pairs of input/output one-to-one mapping relationships are recorded in the lookup table for a positive or a negative gamma correction curve. There are total 256*6 pairs of input/output one-to-one mapping relationships are recorded in the lookup table for gamma correction of all color channels. Finally, based on the lookup values stored in the storage unit, the lookup table unit 211 transforms the 8-bit input signal into the 10-bit output signal which already contains the information of gamma correction according to the one-to-one mapping relationships.

Figure 4:
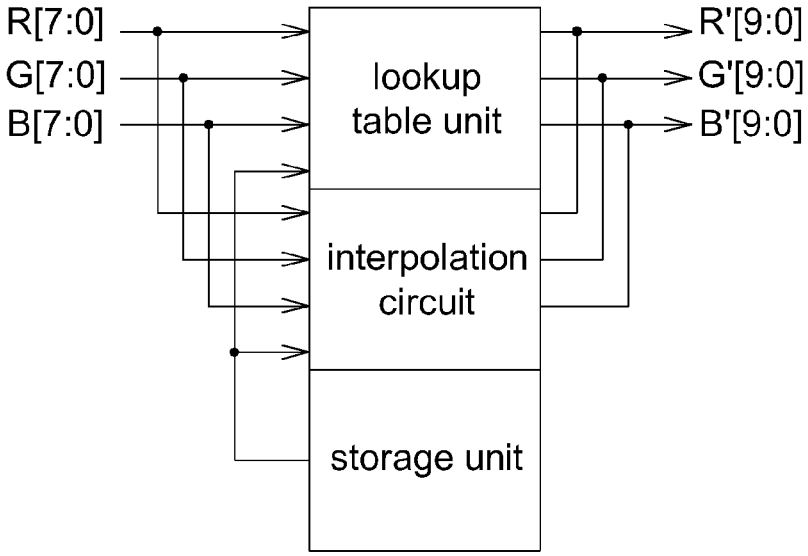
FIG. 4 shows a second type of video signal transformation circuit.
Figure 5:
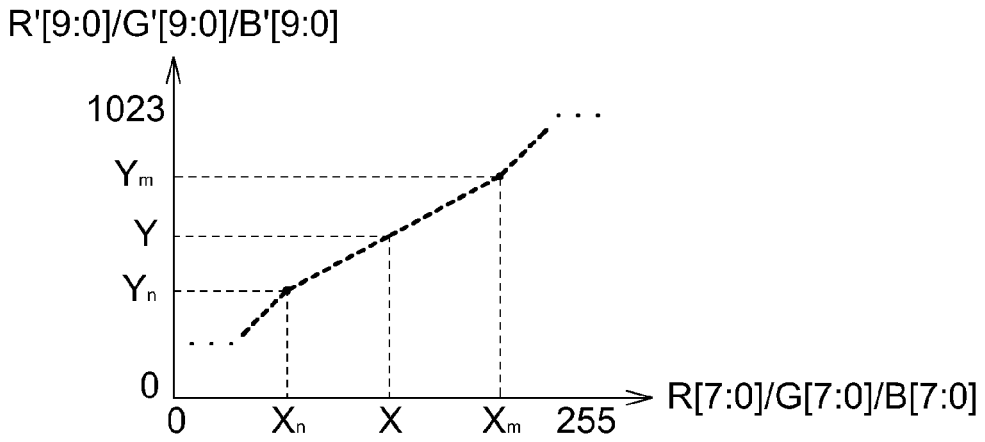
FIG. 5 shows a diagram of interpolation technique.
Figure 6:
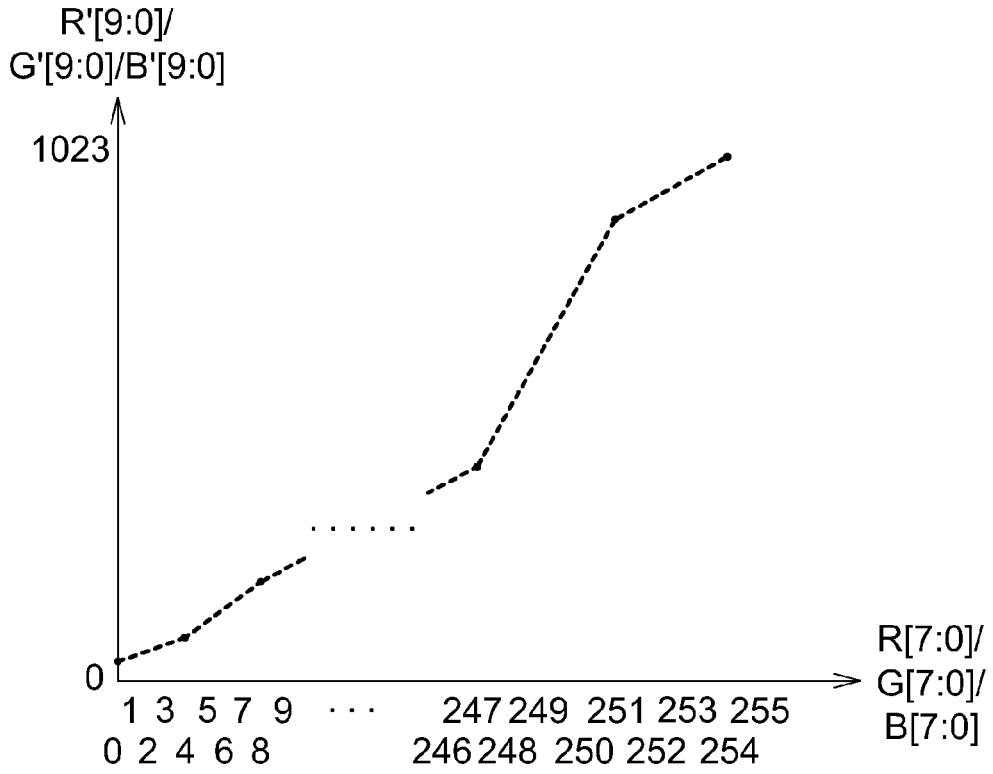
FIG. 6 shows a diagram of the one-to-one mapping relationships between the original video signals and the transformed higher bit depth video signals.

Referring to FIG. 4, FIG. 5 and FIG. 6. FIG. 4 shows a second type of video signal transformation circuit. FIG. 5 shows a diagram of interpolation technique. FIG. 6 shows a diagram of the relationship between the original 8-bit input video signal and the transformed output 10-bit video signal. The video signal transformation circuit 21(2) comprises a storage unit 25, a lookup table unit 211 and an interpolation circuit 212, wherein the storage unit 25, realized by such as registers, stores the lookup values of the lookup table. The lookup values stored in the storage unit are the settings of display reference voltage for gamma corrections of red/green/blue color channels. The lookup table therefore records the information of the gamma correction curves. The lookup table records one-to-one mapping relationships between part of input video signal values and the corresponding output video signal values. The input video signal value, whose one-to-one relationship can be found in the lookup table, is directly transformed to the output values while the input video signal value, whose one-to-one relationships cannot be found in the lookup table, is processed by the interpolation circuit to obtain the corresponding output value. The interpolation process is shown in the example of FIG. 5, $x_n$ and $x_m$ are 2 input data values whose one-to-one relationships are recorded in the lookup table, and the corresponding transformed output data values are respectively $y_n$ and $y_m$. Suppose the input signal value, x, lies between $x_n$ and $x_m$, and the one-to-one mapping relationship between x and y is not recorded in the lookup table. Then, the output data value after interpolation process is given $$y = y_n + \frac{y_m - y_n}{x_m - x_n} \times (x - x_n)$$

according to the data values $x_n$, $x_m$, and the corresponding transformed output data values $y_n$, $y_m$. The bit depth of the output signal of the video signal transformation circuit is greater than that of the input signal. In the present embodiment of the invention, the input and output video signals of the video signal transformation circuit are 8-bit and 10-bit respectively, and the lookup table records one-to-one mapping relationships between some of data values of the 8-bit input signal and the corresponding 10-bit output values. Only 26 out of 256 pairs of input/output one-to-one mapping relationships are recorded in the lookup table for a positive or a negative gamma correction curve. There are total 26*6 pairs of input/output one-to-one mapping relationships are recorded in the lookup table for gamma correction of all color channels. The data value of the 8-bit input signal, whose one-to-one mapping relationships can be found in the lookup table, is directly transformed into the 10-bit output data value by the lookup table unit while the data value of the 8-bit input signal, whose one-to-one mapping relationships cannot be found in the lookup table, is processed by the interpolation circuit to obtain the corresponding 10-bit output data value.

Figure 7:
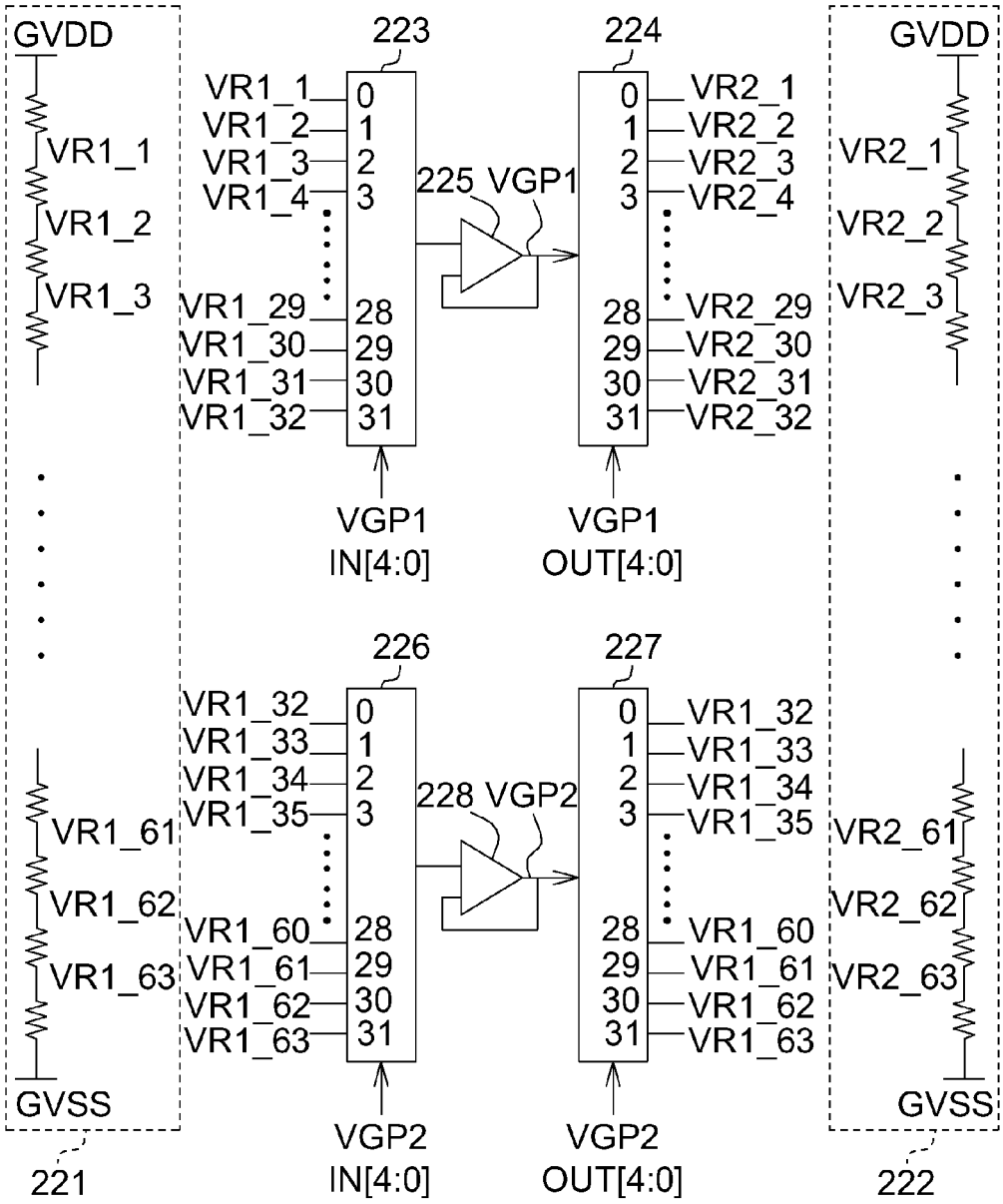
FIG. 7 shows a schematic diagram of a display reference voltage generating circuit according to an embodiment of the invention.
Figures 8, 9:
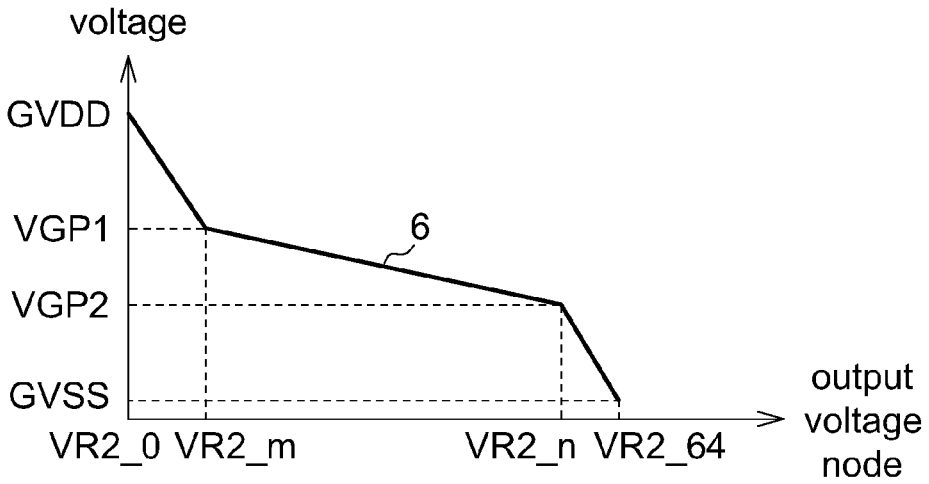
FIG. 8 shows the output voltage curve of a display reference voltage generating circuit.
FIG. 9 shows a table of output voltage $V_o$ of an interpolation operational amplifier to its input of the lower 4 bits of the transformed video signal.

Referring to FIG. 7 and FIG. 8. FIG. 7 shows a schematic diagram of a reference voltage generating circuit according to an embodiment of the invention. FIG. 8 shows the output voltage curve of a display reference voltage generating circuit. The reference voltage generating circuit comprises a resistor string 221, a resistor string 222, a multiplexer 223, a de-multiplexer 224, a unity gain buffer amplifier 225, a multiplexer 226, a de-multiplexer 227 and a unity gain buffer amplifier 228. The resistor string 221 generates voltage division across the voltage nodes VR1_1~VR1_63. The resistor string 222 generates voltage division across the voltage nodes VR2_1~VR2_63. The multiplexer 223 connected between the resistor string 221 and the input node of the buffer amplifier 225 selects a reference voltage from VR1_1~VR1_32 as an input voltage of the buffer amplifier 225 according to a control signal VGP1IN[4:0]. VGP1 is the output voltage of the buffer amplifier 225. The de-multiplexer 224 connected between the buffer amplifier 225 and the output voltage nodes VR2_1~VR2_32 outputs VGP1 to one of the output voltage nodes VR2_1~VR2_32 according to the control signal VGP1OUT[4:0]. The buffer amplifier 225 is connected between the multiplexer 223 and the de-multiplexer 224.

The multiplexer 226 connected between the resistor string 221, and the input node of the buffer amplifier 228 selects a reference voltage from VR1_32~VR1_63 as an input voltage of the buffer amplifier 228 according to control signal VGP2IN[4:0]. VGP2 is the output voltage of the buffer amplifier 228. The de-multiplexer 227 connected between the buffer amplifier 228 and the output voltage nodes VR2_32~VR2_63_outputs VGP2 to one of the output voltage nodes VR2_32~VR2_63 according to the control signal VGP2OUT[4:0]. The buffer amplifier 227 is connected between the multiplexer 226 and the de-multiplexer 227.

The voltages corresponding to the output voltage nodes VR2_0~VR2_64 form a reference voltage curve 6, which is piecewise linear, and the control signal VGP1IN[4:0], the control signal VGP1OUT[4:0], the control signal VGP2IN[4:0] and the control signal VGP2OUT[4:0] are for changing the slope of at least a part of the reference voltage curve 6. In the example of FIG. 8, the control signal VGP1OUT[4:0] controls the de-multiplexer 224 to output a voltage VGP1 to the output voltage node VR2_m, and the control signal VGP2OUT[4:0] controls the de-multiplexer 227 to output a voltage VGP2 to the output voltage nodes VR2_n.

The control signal VGP1IN[4:0] controls the multiplexer 223 to select the voltage VGP1 from VR1_1~VR1_32, and the control signal VGP2IN[4:0] controls the multiplexer 226 to select the voltage VGP2 from VR1_32~VR1_63. Thus, the slope of a part of the reference voltage curve 6 can be flexibly adjusted according to the control signal VGP1IN[4:0], the control signal VGP1OUT[4:0], the control signal VGP2IN[4:0] and the control signal VGP2OUT[4:0] so as to increase the output voltage resolution per step of the interpolation operational amplifier 24 within a particular voltage interval. Detailed circuits of the interpolation operational amplifier 24 can be implemented with reference to the U.S. Pat. No. 7,541,844B2, and the similarities are not repeated here.

Referring to FIG. 9, a table of the correspondence relationships between the lower 4 bits of the transformed video signal P2 and the driving voltage is shown. As disclosed above, the interpolation operational amplifier 24 outputs a driving voltage V0 according to its input signals, the lower 4 bits of the transformed video signal P2, the first reference voltage $V_H$ and the second reference voltage $V_L$. Given $V_H$ and $V_L$, the correspondence relationships between the lower 4 bits of the transformed video signal P2 and the driving voltage Vo are illustrated in FIG. 9. For example, when P2 equals 0000, the driving voltage $Vo=V_H$. When P2 equals 0001, the driving voltage $$Vo = \frac{15}{16} \times V_H + \frac{1}{16} \times V_L.$$

When P2 equals 0010, the driving voltage $$Vo = \frac{14}{16} \times V_H + \frac{2}{16} \times V_L.$$

When P2 equals 0011, the driving voltage $$Vo = \frac{13}{16} \times V_H + \frac{3}{16} \times V_L.$$

When P2 equals 0100, the driving voltage $$Vo = \frac{12}{16} \times V_H + \frac{4}{16} \times V_L.$$

When P2 equals 0101, the driving voltage $$Vo = \frac{11}{16} \times V_H + \frac{5}{16} \times V_L.$$

When P2 equals 0110, the driving voltage $$Vo = \frac{10}{16} \times V_H + \frac{6}{16} \times V_L.$$

When P2 equals 0111, the driving voltage $$Vo = \frac{9}{16} \times V_H + \frac{7}{16} \times V_L.$$

When P2 equals 1000, the driving voltage $$Vo = \frac{8}{16} \times V_H + \frac{8}{16} \times V_L.$$

When P2 equals 1001, the driving voltage $$Vo = \frac{7}{16} \times V_H + \frac{9}{16} \times V_L.$$

When P2 equals 1010, the driving voltage $$Vo = \frac{6}{16} \times V_H + \frac{10}{16} \times V_L.$$

When P2 equals 1011, the driving voltage $$Vo = \frac{5}{16} \times V_H + \frac{11}{16} \times V_L.$$

When P2 equals 1100, the driving voltage $$Vo = \frac{4}{16} \times V_H + \frac{12}{16} \times V_L.$$

When P2 equals 1101, the driving voltage $$Vo = \frac{3}{16} \times V_H + \frac{13}{16} \times V_L.$$

When P2 equals 1110, the driving voltage $$Vo = \frac{2}{16} \times V_H + \frac{14}{16} \times V_L.$$

When P2 equals 1111, the driving voltage $$Vo = \frac{1}{16} \times V_H + \frac{15}{16} \times V_L.$$

Therefore, the interpolation operational amplifier 24 can promptly output the driving voltage V0 corresponding to the higher bit depth transformed video signal according to the correspondence relationships illustrated in FIG. 9.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display driving circuit, comprising:

a video signal transformation circuit for transforming an input video signal into a transformed video signal with a higher bit depth [which contains information of gamma correction according to a lookup table (LUT) or a digital interpolation technique, the transformed video signal with the higher bit depth comprises an upper n bits data and a lower m bits data, wherein n+m equals a bit depth of the transformed video signal and the bit depth of the transformed video signal is higher] than that of the input video signal *according to a lookup table (LUT) recording mapping relationships between a part of input video signal values and corresponding output signal values, and for calculating the corresponding output signal values for the input video signal values of which the mapping relationships are not recorded in the LUT*;

[a reference voltage generating circuit for generating a plurality of reference voltages;]

*a data latch coupled to the video signal transformation circuit;*

*a level shifter coupled to the data latch;* a digital to analog converter (DAC) [for selecting a first reference voltage and a second reference voltage from the reference voltages generated by the reference voltage generating circuit, wherein the first reference voltage and the second reference voltage are selected according to the upper n bits data of the transformed video signal with the higher bit depth] *receiving n bit data from the level shifter*; and an interpolation operational amplifier [for outputting a driving voltage corresponding to the transformed video signal with the higher bit depth according to the first reference voltage, the second reference voltage and the lower m bits data of the transformed video signal with the higher bit depth] *coupled to the digital to analog converter and receiving m bit data from the level shifter for outputting a driving voltage, wherein n+m equals a bit depth of the transformed video signal.*

2. The display driving circuit according to claim [1] *19*, wherein the video signal transformation circuit comprises:

a storage unit for storing a plurality of lookup values of the lookup table; and a lookup table unit for transforming the input video signal into the transformed video signal with the higher bit depth through [a plurality of] *the* mapping relationships[, wherein the lookup table records the mapping relationships between a plurality of input video signal values and a plurality of corresponding output video signal values].

3. The display driving circuit according to claim [1] *19*, wherein the video signal transformation circuit comprises:

a storage unit for storing [the] *a plurality of* lookup values of the lookup table; and a lookup table unit for transforming the input video signal into the transformed video signal with the higher bit depth through [a plurality of] *the* mapping relationships[, wherein the lookup table records the mapping relationships between part of input video signal values and the corresponding output video signal values; and a digital interpolation circuit for calculating the corresponding output signal values for the input video signals whose mapping relationships are not recorded in the lookup table].

4. The display driving circuit according to claim [1] *19*, wherein the lookup table comprises information of mapping relationships for voltage settings of a gamma correction curve of each color channel.

5. [The] *A* display driving circuit [according to claim 4], *comprising:*

*a video signal transformation circuit for transforming an input video signal into a transformed video signal with a higher bit depth than that of the input video signal;*

*a data latch coupled to the video signal transformation circuit;*

*a level shifter coupled to the data latch;*

*a digital to analog converter (DAC) receiving n bit data from the level shifter; and*

*an interpolation operational amplifier coupled to the digital to analog converter and receiving m bit data from the level shifter for outputting a driving voltage, wherein n+m equals a bit depth of the transformed video signal;*

*wherein the video signal transformation circuit transforms the input video signal into the transformed video signal according to a lookup table (LUT) or a digital interpolation technique, the transformed video signal with the higher bit depth comprises the n bits data and the m bits data;*

*wherein the lookup table comprises information of mapping relationships for voltage settings of a gamma correction curve of each color channel; and* wherein the bit depth of the input video signal is m, the number of mapping relationships recorded in the lookup table for each gamma correction curve is less than $2^m$.

6. [The] *A* display driving circuit [according to claim 4], *comprising:*

*a video signal transformation circuit for transforming an input video signal into a transformed video signal with a higher bit depth than that of the input video signal;*

*a data latch coupled to the video signal transformation circuit;*

*a level shifter coupled to the data latch;*

*a digital to analog converter (DAC) receiving n bit data from the level shifter; and*

*an interpolation operational amplifier coupled to the digital to analog converter and receiving m bit data from the level shifter for outputting a driving voltage, wherein n+m equals a bit depth of the transformed video signal;*

*wherein the video signal transformation circuit transforms the input video signal into the transformed video signal according to a lookup table (LUT) or a digital interpolation technique, the transformed video signal with the higher bit depth comprises the n bits data and the m bits data;*

*wherein the lookup table comprises information of mapping relationships for voltage settings of a gamma correction curve of each color channel; and* wherein the bit depth of the input video signal is m, the number of mapping relationships recorded in the lookup table for each gamma correction curve is equal to $2^m$.

7. [The] *A* display driving circuit [according to claim 1], [wherein the reference voltage generating circuit comprises] *comprising:*

*a video signal transformation circuit for transforming an input video signal into a transformed video signal with a higher bit depth than that of the input video signal;*

*a data latch coupled to the video signal transformation circuit;*

*a level shifter coupled to the data latch;*

*a digital to analog converter (DAC) receiving n bit data from the level shifter;*

*an interpolation operational amplifier coupled to the digital to analog converter and receiving m bit data from the*

*level shifter for outputting a driving voltage, wherein n+m equals a bit depth of the transformed video signal; and*

*a reference voltage generating circuit for generating a plurality of reference voltages, comprising*:

a first resistor string for generating voltage divisions across the first resistor string;

a second resistor string for generating voltage divisions across the second resistor string;

a first buffer amplifier;

a first multiplexer connected between the first resistor string and the first buffer amplifier for selecting a reference voltage from voltage divisions across the first resistor string as an input voltage of the first buffer amplifier according to a first control signal; and a first de-multiplexer connected between the first buffer amplifier and the second resistor string for outputting a reference voltage to one of a plurality of output voltage division nodes across the second resistor string according to a second control signal.

8. The display driving circuit according to claim 7, wherein the reference voltage generating circuit further comprises:

a second buffer amplifier;

a second multiplexer connected between the first resistor string and the second buffer amplifier for selecting the reference voltage from the voltage divisions across the first resistor string as an input voltage of the second buffer amplifier according to a third control signal; and a second de-multiplexer connected between the second buffer amplifier and the second resistor string for outputting the reference voltage to one of the output voltage division nodes across the second resistor string according to a fourth control signal.

9. The display driving circuit according to claim 8, wherein the voltages corresponding to the output voltage nodes form a reference voltage curve, the reference voltage curve is piecewise linear[, and the first control signal, the second control signal, the third control signal and the fourth control signal are used for changing the slope of at least a part of the reference voltage curve].

10. The display driving circuit according to claim [1] *20*, wherein the reference voltage generating circuit is a positive reference voltage generating circuit.

11. The display driving circuit according to claim 10, wherein the bit depth of the input video signal is m, and the number of reference voltages is less than $2^m$.

12. The display driving circuit according to claim [1] *20*, wherein the reference voltage generating circuit is a negative reference voltage generating circuit.

13. The display driving circuit according to claim 12, wherein the bit depth of the input video signal is m, and the number of reference voltages is less than $2^m$.

*14. The display driving circuit according to claim 9, wherein the first control signal, the second control signal, the third control signal and the fourth control signal are used for changing the slope of at least a part of the reference voltage curve.*

*15. The display driving circuit according to claim 1, wherein the level shifter translates the power domain for the transformed video signal, the transformed video signal is divided into the n bit data and the m bit data at an output node of the level shifter.*

*16. The display driving circuit according to claim 1, further comprising:*

*a reference voltage generating circuit for generating a plurality of reference voltages;*

*wherein the digital to analog converter selects a first reference voltage and a second reference voltage from the reference voltages generated by the reference voltage generating circuit, wherein the first reference voltage and the second reference voltage are selected according to the n bit data of the transformed video signal with the higher bit depth.*

*17. The display driving circuit according to claim 16, wherein the interpolation operational amplifier outputs the driving voltage corresponding to the transformed video signal with the higher bit depth according to the first reference voltage, the second reference voltage and the m bit data of the transformed video signal with the higher bit depth.*

*18. The display driving circuit according to claim 17, wherein the interpolation operational amplifier adjusts a proportion of the first reference voltage and the second reference voltage according to the m bit data to generate the driving voltage.*

*19. The display driving circuit according to claim 1, wherein the transformed video signal with the higher bit depth comprises the n bits data and the m bits data.*

*20. The display driving circuit according to claim 1, further comprising a reference voltage generating circuit for generating a plurality of reference voltages.*

* * * * *